(12) United States Patent
Brauss

(10) Patent No.: US 7,203,282 B2
(45) Date of Patent: Apr. 10, 2007

(54) REMOVABLE FILTER HOLDER AND METHOD

(75) Inventor: Michael Brauss, Amherstburg (CA)

(73) Assignee: Proto Manufacturing Ltd. (CA)

( * ) Notice: Subject to any disclaimer, the term of this patent is extended or adjusted under 35 U.S.C. 154(b) by 0 days.

(21) Appl. No.: 10/776,877

(22) Filed: Feb. 11, 2004

(65) Prior Publication Data

US 2005/0175147 A1    Aug. 11, 2005

(51) Int. Cl.
*H01J 35/12* (2006.01)

(52) U.S. Cl. ............... 378/141; 378/199; 378/200

(58) Field of Classification Search ........ 378/199–202, 378/130, 141, 142
See application file for complete search history.

(56) References Cited

U.S. PATENT DOCUMENTS 4,412,345 A * 10/1983 Workman et al. ............ 378/78
5,596,622 A * 1/1997 Peralta et al. ............... 378/199
6,206,565 B1   3/2001 Kendall et al.
6,623,160 B2   9/2003 McCarthy, Jr.

* cited by examiner

*Primary Examiner*—Edward J. Glick
*Assistant Examiner*—Jurie Yun
(74) *Attorney, Agent, or Firm*—Fitch, Even, Tabin & Flannery

(57) ABSTRACT

A cooling system is provided for high energy emitting devices such as employed in X-ray diffraction testing equipment. The cooling system includes a removable filter holder that carries a filter for being disposed in a cooling path formed in the X-ray head assembly with the holder including a detachable connection to the head. The removable holder allows for servicing of the filter without requiring significant disassembly operations on the X-ray head assembly. In the preferred form, the holder has a screw-type configuration and the detachable connection is a threaded connection to a cooling head portion of the X-ray head assembly.

40 Claims, 8 Drawing Sheets

REMOVABLE FILTER HOLDER AND METHOD

FIELD OF THE INVENTION

The present invention pertains to cooling of devices that generate high energy emissions such as those used in X-ray diffraction analysis.

BACKGROUND OF THE INVENTION

Non-destructive testing utilizing X-ray diffraction techniques is playing an increasingly important role in measuring residual stresses and other material characteristics. Once limited to laboratory conditions, X-ray diffraction is now made available for use in the field to analyze parts and structures of unlimited size and in almost any location. Advances in the art made possible by the assignee of the present invention allows on-site investigation in practical working environments, that is, in spaces constrained by real world equipment. To this end, open beam-type X-ray diffraction equipment has been employed most effectively. In those systems, the X-ray goniometer head is cantilevered and carries fiberoptic detectors toward the forward end thereof. Nevertheless, in order to meet the demands of industrial manufacturers and others, it has become increasingly important to reduce the size of the X-ray diffraction head, thus placing greater emphasis on cooling requirements.

One class of X-ray generating devices has an X-ray tube mounted within a vacuum housing. The X-ray tube includes anode and cathode assemblies, with the cathode assembly emitting electrons when energized. The anode assembly provides an anode target axially spaced from the cathode and oriented so as to receive streams of electrons emitted by the cathode. The electrons are typically focused at a spot or line on the anode target utilizing high voltage beam-confining fields. The anode target is made of a high refractory metal so that electrons striking the anode material impart kinetic energy sufficient to generate X-rays. The X-rays are passed through a window of the vacuum enclosure and are collimated so as to be directed with sufficient intensity on an object to be tested.

Typically only a small percentage of energy inputted to the X-ray tube results in the production of X-rays. The remaining energy is converted through various processes into high temperature heat within the vacuum tube. For example, certain secondary processes cause internal heating of the X-ray tube components. Back scattering results from electrons bouncing off the anode target so as to impinge upon various components of the X-ray tube located within the evacuated housing. It is essential that high operating temperatures within the X-ray tube be efficiently reduced and that the heat loading of the overall system be effectively dissipated by appropriate cooling equipment.

As mentioned, in one class of X-ray generating devices, an outer housing surrounds the evacuated housing of the X-ray tube. The spacing between the inner evacuated housing and the outer housing provides a cavity which is filled with a heat transfer medium such as air (by default), water or glycol-based fluid. A dielectric gas or liquid fluid medium can also be employed. This cavity is sometimes filled with a special liquid coolant such as dielectric oil or water, which can be circulated so as to transfer heat loading from the evacuated housing, through the outer housing to an appropriate external cooling station. In these applications, the cooling medium also serves as an electrical insulator which must withstand the electrical potential between the inner evacuated housing, typically operated at a high voltage potential and the outer housing typically operated at ground potential. As is becoming increasingly better understood, a number of different processes give rise to particulates and other contamination which become entrained in the cooling medium. Included, for example, is the catalytic formation of oil carbon deposits at local high temperature sites located along the evacuated housing. It is important that the particulates and other contaminants be removed from the coolant medium before they enter regions of high electric field between the inner and outer housings, thus giving rise to the possibility of a high voltage breakdown event.

In another class of X-ray generating device, the X-ray tube is operated in a "dry" environment, with the cavity between the X-ray tube and the outer housing being devoid of a liquid medium. However, because of the high heat loadings encountered, an effective coolant arrangement must be provided for the X-ray tube, especially the anode portion thereof. In one arrangement, a manifold is fixed to the X-ray tube and coolant lines are connected to the manifold. Filtration screens are sometimes provided for the manifold assembly and thus are physically carried by the X-ray tube. Service of these filtration screens requires removal of the X-ray tube from its housing, even though the X-ray tube itself does not require service. Such filtration service procedures create difficulties and can compromise the alignment of the tube relative to the housing, and particularly the tube anode assembly relative to the housing window, and may lead to contamination of the X-ray tube surfaces. With respect to tube/housing alignment, it has been found that unbolting the tube and housing from each other for disassembly and then rebolting the tube and housing together can cause slight variations in the relative positions between the anode assembly and window due to the tolerances between the bolts and apertures therefor potentially leading to inaccuracies in test measurements. Accordingly, ensuring proper tube and housing alignment can create significant servicing overhead in current x-ray heads.

SUMMARY OF THE INVENTION

In accordance with the present invention, a detachable filter carrier or holder is provided for use with non-destructive testing devices of the type that generate high energy emissions for being directed toward the tested object. Typically, the emission beam will diffract and an energy detector will collect the diffracted energy data which is then processed and can be presented in graphs or in direct material characteristic value numbers, e.g. stress or retained austenite values. Although described herein with respect to X-rays, the present invention could also be implemented for use with other high energy devices that generate heat in their operation.

The present detachable filter carrier is advantageous in that it obviates the need to disassemble the cooling system for the X-ray head assembly or goniometer to service the cooling fluid filter, such as for cleaning or replacement thereof, as required with prior X-ray goniometer heads where the cooling head or manifold was fastened to the X-ray tube so that accessing filters that may be provided in the cooling head necessitated removal of the tube along with the cooling head from the outer housing therefor. In the present invention, a detachable connection between the filter carrier or holder and X-ray head is provided so that with a relatively easy and straightforward detachment operation, the carrier can be removed from the X-ray head leaving the X-ray head tube and housing therefor substantially intact assembled together. In this manner, after servicing of the filter, the carrier can be easily reattached to the X-ray head without concern for proper alignment and orientation of the tube and housing, and particularly the tube anode assembly and housing window, as is necessary with the previously described cooling system. The detachable connection is preferably a threaded connection such as between the body of the filter carrier itself and the X-ray head or more particularly a cooling head for being secured thereto. Other detachable connections are also contemplated such as bayonet connections, friction fits, and the like.

In a preferred form, the present invention provides coolant flow paths within the walls of the outer housing and includes a filtration site which is accessible from outside of the outer housing. In one arrangement, the present invention provides filter screens carried on a removable carrier or holder which is installed and removed from outside the outer housing without requiring disassembly of the X-ray tube from the outer housing or other components of the X-ray generating device. Accordingly, the filtration device can be serviced without disturbing the X-ray tube, and in particular, without requiring the X-ray tube to be removed or its surfaces contacted by service personnel. In one aspect, a removable fluid directing assembly is provided for being removably mounted to the cooling head adjacent the anode region of the X-ray tube with the cooling head installed on the x-ray head. Accordingly, with the fluid directing assembly removed, a limited visual inspection of the X-ray tube and specifically the otherwise obstructed anode surface can be performed without disassembly of the outer housing and tube or other components of the X-ray device as previously required. In this manner, the anode assembly can be more easily visually inspected for any potential damage thereto as by overheating by simply removing the fluid directing assembly from the cooling head.

In one aspect, the present invention provides a cooling system for an X-ray diffraction tube in which a housing in the form of a hollow cylindrical jacket surrounds at least a portion of the X-ray diffraction tube, with the hollow interior of the jacket including a flow channel for channeling flow of a liquid coolant. The housing further includes a receptacle for receiving a filter holder so as to dispose a filter in the flow channel to thereby provide cleaning of the liquid coolant. In one preferred embodiment, the housing comprises a cylindrical hollow jacket surrounding the X-ray diffraction tube with the hollow interior of the jacket comprising the flow channel. A cooling head engageable with one end of the cylindrical hollow jacket defines an internal flow passageway in communication with the flow channel of the hollow jacket. A receptacle is located in the center of the cooling head with internal passageways within the cooling head extending in radial directions so as to bring flow of coolant into and out of the receptacle. The filter holder is provided in the form of a bolt or screw fastener having an enlarged head and a hollow body or stem portion receiving a filter screen. A cross hole extending through the stem provides flow communication with the hollow stem, permitting coolant flow across the surface of the filter screen. The filter holder is threadingly engaged with the cooling head receptacle portion, thereby allowing the filter holder to be quickly and easily removed from the device, as desired. The filter holder in this embodiment contacts only the cooling head portion of the outer housing and requires neither disassembly of the X-ray head for removing the holder or contact with the X-ray tube. With the filter holder removed from the cooling head, the filter screen can be removed, washed or replaced with a fresh filter screen.

In other aspects, the present invention can be incorporated in X-ray generating devices in which the space between the X-ray tube and outer housing is filled with a coolant fluid, either gas or liquid. Coolant flow is conducted through the outer housing to a receptacle portion of the cooling head, as described above. A removable filter holder engaged with the receptacle portion carries a filtration member such as a filter screen to provide continual cleaning of the coolant while coolant flow conditions are maintained.

BRIEF DESCRIPTION OF THE DRAWINGS

FIGS. 12A–12C are views of a fluid directing assembly including components thereof;

DETAILED DESCRIPTION OF THE PREFERRED EMBODIMENTS

Figure 1:
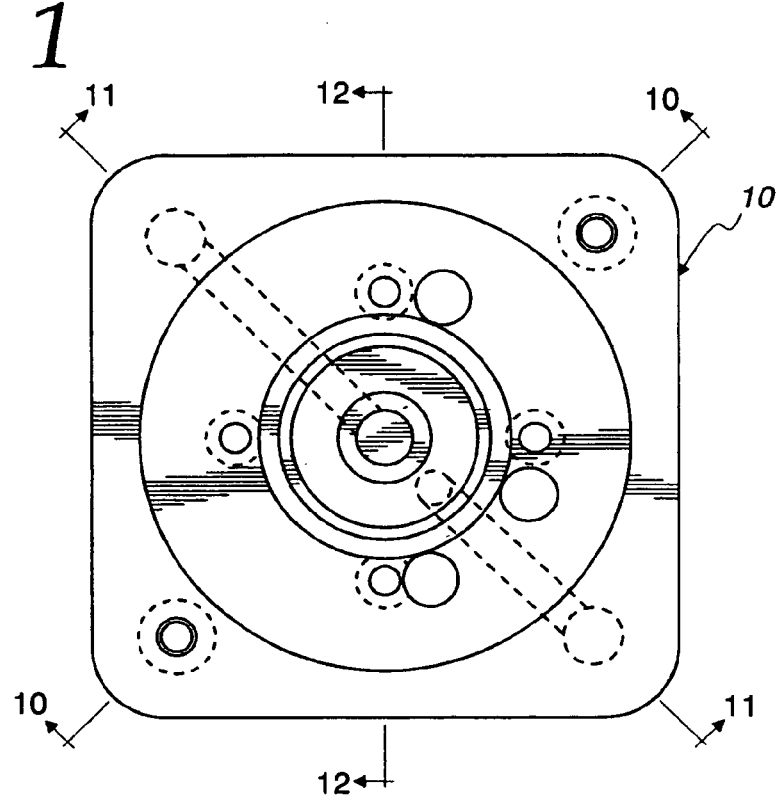
FIG. 1 is an end view of a radiation emitting device in accordance with present invention showing an X-ray head assembly thereof.
Figure 2:
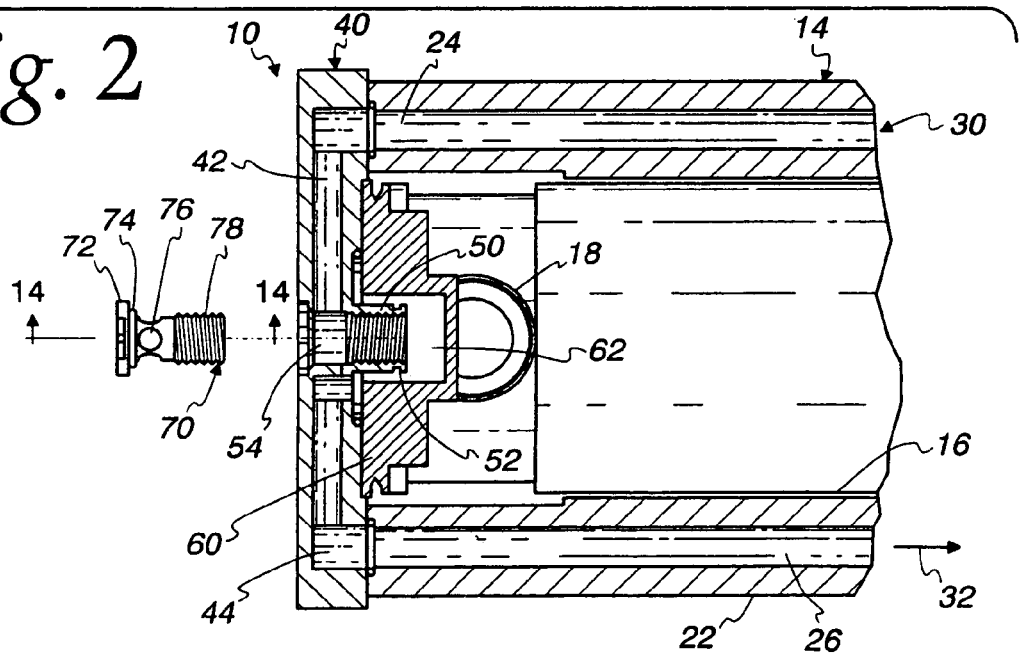
FIG. 2 is a cross-sectional view taken along the line 11—11 of FIG. 1 showing the coolant flow path through the X-ray head assembly with a filter holder detached therefrom.
Figure 3:
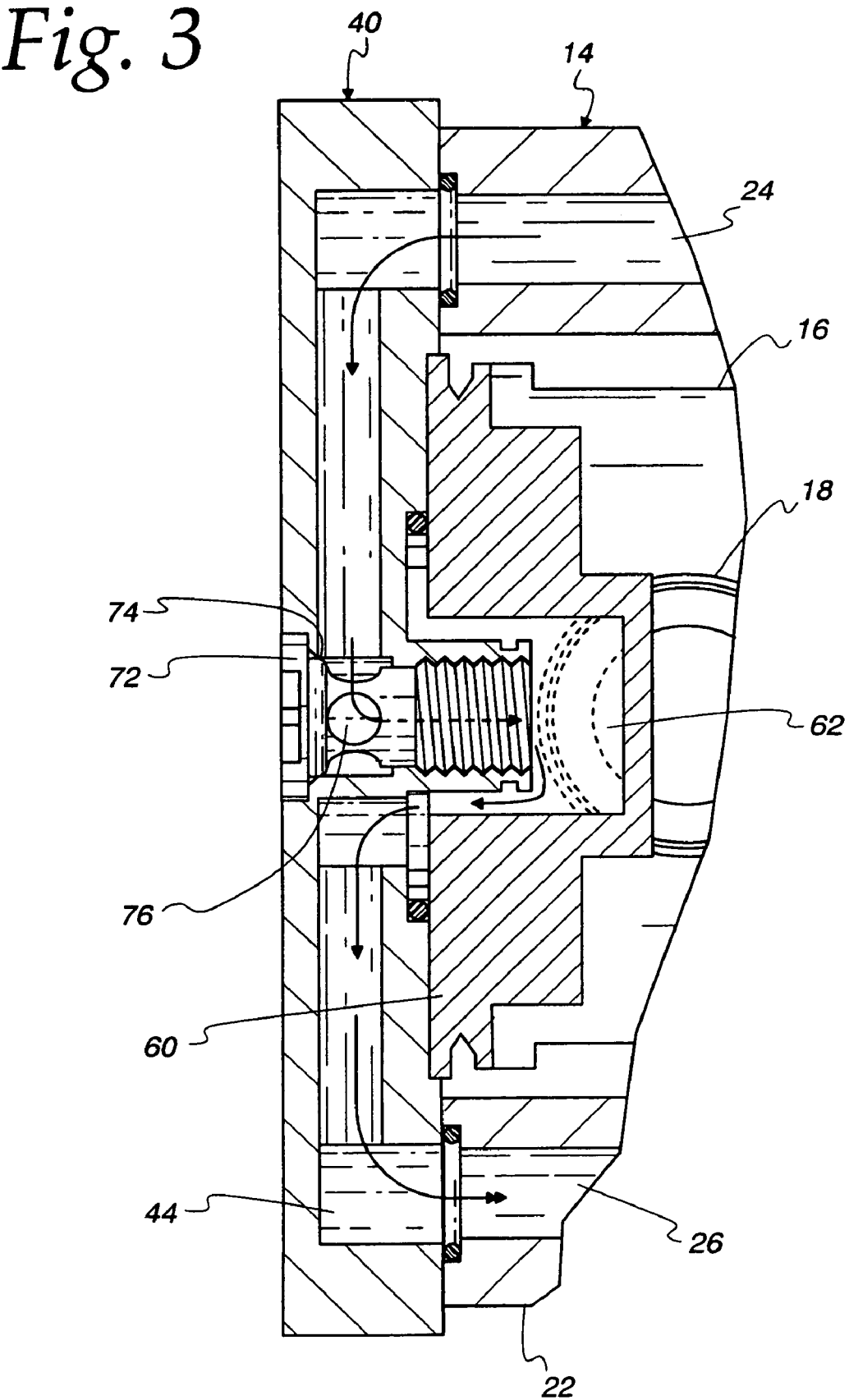
FIG. 3 is an enlarged fragmentary view of FIG. 2 except with the filter holder attached to a cooling head portion of the X-ray head assembly.
Figure 18:
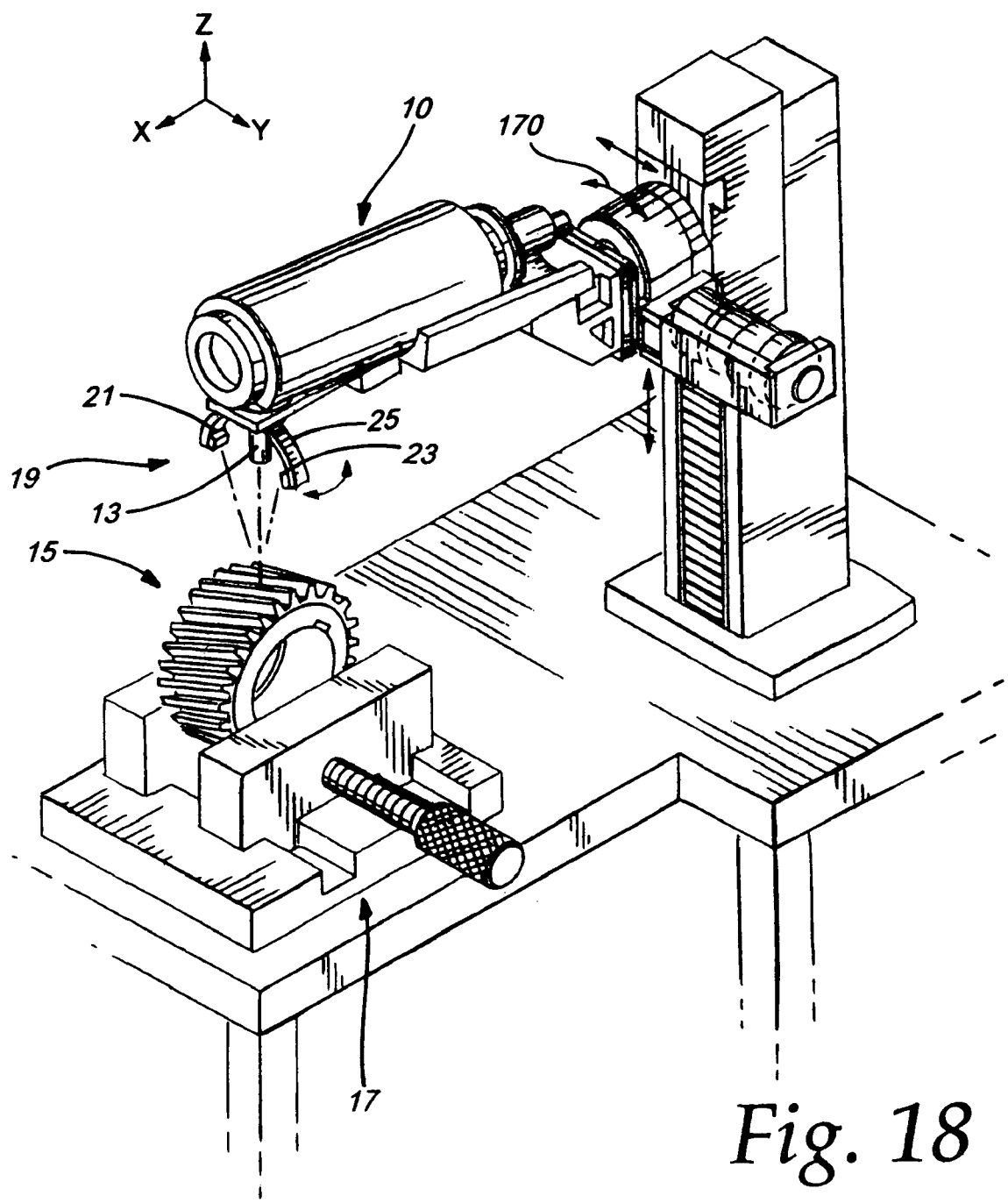
FIG. 18 is a perspective view of a non-destructive X-ray diffraction system showing an X-ray head assembly having a collimator and detectors for taking X-ray diffraction measurements from a part fixed therebelow.

Turning now to the drawings and initially to FIGS. 1–3, an X-ray emitting device is generally indicated at 10. Device 10 preferably comprises an X-ray source, or goniometer or X-ray head assembly for use in X-ray diffraction analysis. A representative test set-up is shown in FIG. 18 including a typical X-ray head assembly in which the present cooling system can be incorporated. Generally, the head assembly will include a collimator 13 depending from the forward end portion thereof for directing X-rays at part such as the illustrated gear 15 rigidly held by fixturing 17 therebelow.

The head assembly 10 along with its collimator 13 is commonly driven in an arcuate path 170 so that X-rays are directed at the region on the part 15 to be tested from a variety of different angles to provide several different data points from which X-ray diffraction measurement information can be gleaned. In addition to the collimator 13, X-ray detector assembly 19 is carried by the head assembly 10 and includes a pair of detectors or sensors 21 and 23 that are typically mounted on either side of the collimator 13 via an arcuate detector mount 25. The detectors 21 and 23 can be fiber optic detectors that sense the resultant or diffracted X-rays for processing by a control unit connected to the fiber optic detectors 21 and 23.

As will be seen herein, the present invention provides improved cooling for the device without requiring removal or disturbance of the X-ray diffraction tube, the source of heat located within device 10. The X-ray tube 12 is schematically illustrated in the cross-sectional view of FIG. 2 taken along the line 11—11 of FIG. 1. The X-ray tube 12 includes an evacuated housing 16 which, as will be seen herein, is the innermost of two housings and is therefore referred to as the "inner" housing. The X-ray tube 12 is contained within an outer X-ray tube holder, or outer housing generally indicated at 14. Contained within the X-ray tube housing are an electron source or cathode assembly and an X-ray emitting target or anode assembly 11 located adjacent the left end of the X-ray head 10 in the tube 12. A window 18 is provided through which the X-ray beam is passed out from tube 12 and into collimator 13. Preferably, the anode material 11a, e.g. copper, manganese or chrome (shown schematically in FIG. 3) of the assembly 11 of the X-ray tube is radially aligned with and located adjacent window 18 and angled so that as electrons from the cathode assembly axially spaced from the anode assembly strike the anode assembly they are redirected radially toward the window. As is apparent, the anode and cathode assemblies, and in particular the anode assembly 11, comprise important heat sources which benefit from the cooling provided by the present invention.

Referring now to FIGS. 2 and 3, outer housing 14 includes a hollow cylindrical jacket or wall 22 having a flow channel including a coolant intake passageway 24 and a coolant outake passageway 26. Accordingly, the housing 14 includes a radially outer wall portion 22a and a radially inner wall portion 22b between which the flow passageways 24 and 26 are formed. The direction of coolant flow is indicated by arrows 30, 32 in FIG. 2. As indicated in FIG. 2, X-ray tube 12 is inserted within the inner bore of housing wall 22 with a relatively close fit so that it is adjacent inner wall portions 22b of the housing 14. This allows the preferred X-ray tube to be operated in a "dry" condition with heat being transferred from inner housing 16 through wall 22, and specifically inner wall portions 22b to the coolant passageways 24, 26.

With continued reference to FIGS. 2 and 3, housing 14 further includes a cooling head 40 in the form of cover plate 40 that is secured to the X-ray head 10 at the anode end of the tube 16 and housing 22 to provide the head assembly 10 with an outer end wall thereof. The cover plate cooling head 40 defines an internal radial coolant intake passageway 42 and an internal radial coolant outake passageway 44. As indicated in FIG. 2, the internal passageways 24, 26 of housing wall 22 are arranged in flow communication with the internal passageways 42, 44 of cooling head 40 when the cooling head 40 is fastened to the X-ray head 10. Located at the approximate center of cooling head 40 is a fitted receptacle or socket 50 having an internally threaded portion 52 at its inner end, as shown in FIG. 2. Socket 50 has an unthreaded, headed screw shape 54 for fluid-tight engagement with a filter holder 70 or filter screw, as will be explained herein. Accordingly, the socket is located at the axially outer end of the housing along an end wall formed thereat by cover plate 40, and the socket communicates with the external environment surrounding the housing.

Coolant flow travels axially in the direction of arrow 30 entering axial passageway 24 at the upper end of FIG. 3. Continuing reference to FIG. 3, coolant flow then travels through the upper end passageway 42 of the cooling head that communicates with the housing intake passageway 24, with passageway 42 redirecting fluid flow radially to enter socket 50. Socket 50 forces cooling fluid to flow in the axial direction of device 10, as will be discussed further hereinafter. The coolant flow then sweeps across surfaces 59 of an internal heat sink or heat transfer member 60 fixedly disposed within device 10. Typically, the heat sink member 60 will be formed integrally as a portion of the anode assembly 11 with the anode material coated on or welded to or otherwise attached to the axially interior surface 61 of the heat sink member 60. In another form, the heat transfer member 60 is formed separately so as to comprise a portion of the inner housing and is located closely adjacent the anode assembly so as to efficiently transfer heat from this significant heat source. Accordingly, the member 60 can serve as an axial end wall of the X-ray head 10, when the cooling head 40 is removed. As can be seen in FIGS. 2 and 3, a receptacle or socket portion 62 is defined by heat sink 60 aligned with socket 50 which enhances the heat exchange in the central portion of the X-ray device. As coolant flows through the socket portion 62, heat from the heat sink member 60 will be transferred to the coolant to continually remove heat from the heat sink member 60, and the X-ray tube 12.

Figure 11:
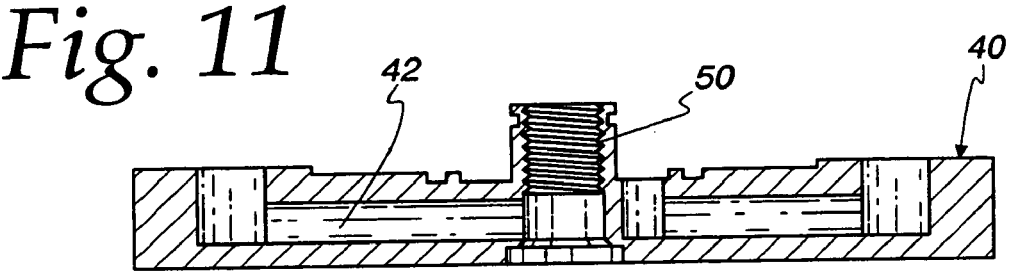
FIG. 11 is a cross-sectional view taken along the line 11—11 of FIG. 1 showing the coolant flow path through the cooling head.

The head plate socket 50 is formed by an annular wall portion 51 including internally threaded portion 52 that projects axially generally beyond an axially inner surface 41 of cover plate 40 and into socket portion 62 of heat transfer member 60 with the plate 40 fastened to the X-ray head 10, and specifically the outer housing 14 thereof. In the area of the passageway 44 and particularly at the radially inner end thereof, there is an axial extension wall portion 53 of the annular socket wall 51 which substantially prevents direct fluid flow between radial passageways 42 and 44 of the head cover plate 40, as best seen in FIGS. 3 and 11. Instead, the wall portion 53 causes fluid flow from passageway 42 to be redirected axially through the socket 50, and through the filter holder 70 and filter carried therein, as described hereinafter.

An inlet port 55 is provided in the cover plate 40 adjacent the annular wall 51 and the extension portion 53 thereof. The port 55 opens to the inner surface 41 of the plate 40 and extends axially to the upper end of the passageway 44, as shown in FIGS. 2 and 3. Accordingly, fluid flowing axially inward in socket 50 enters socket 62 and is redirected back axially outward to inlet port 55 of the passageway 44 whereupon it enters passageway 44 and flows radially outward to axial passageway 26 and then out from the goniometer head 10 to be cooled.

In prior x-ray head assemblies, the cooling head manifold had cooling fluid that traveled through a fluid directing device fixed to the inner x-ray tube prior to impinging on the axially exterior surface of the anode assembly. Typically, this device is in the form of a cup-shaped member having a bottom wall in which a slit is formed. This slit is aligned with the target area of the anode assembly against which high energy electrodes from the cathode assembly are directed. As previously discussed, the electrodes can be formed in a spot or line pattern to impinge against the anode material. This pattern falls within the footprint of the aligned cup slit. Thus, cooling fluid is directed through the spray slit so that it is focused at the area of the anode assembly where cooling is most necessary. The present cooling head 40 is adapted to operate in conjunction with the prior fluid directing device as described above. However, to be able to visually inspect areas on the surface 59 of the anode assembly 11 generally beyond that aligned with the slit, the tube 16 still has to be removed from the housing 14 to disassemble the cup (not shown) therefrom as otherwise the view of the anode surface 59 is obstructed thereby.

Figure 12:
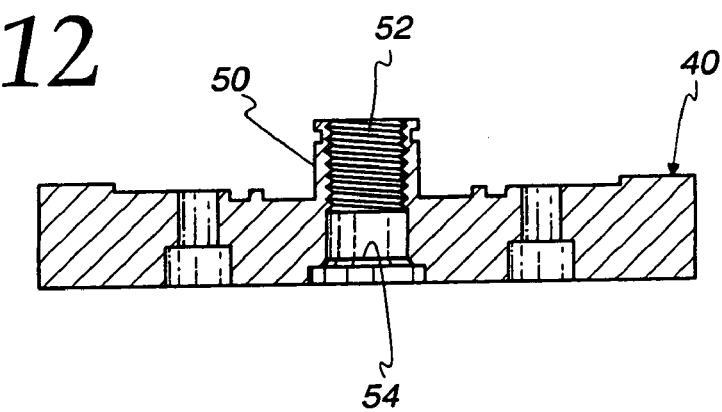
FIG. 12 is a cross-sectional view taken along the line 12—12 of FIG. 1.
Figure 12:
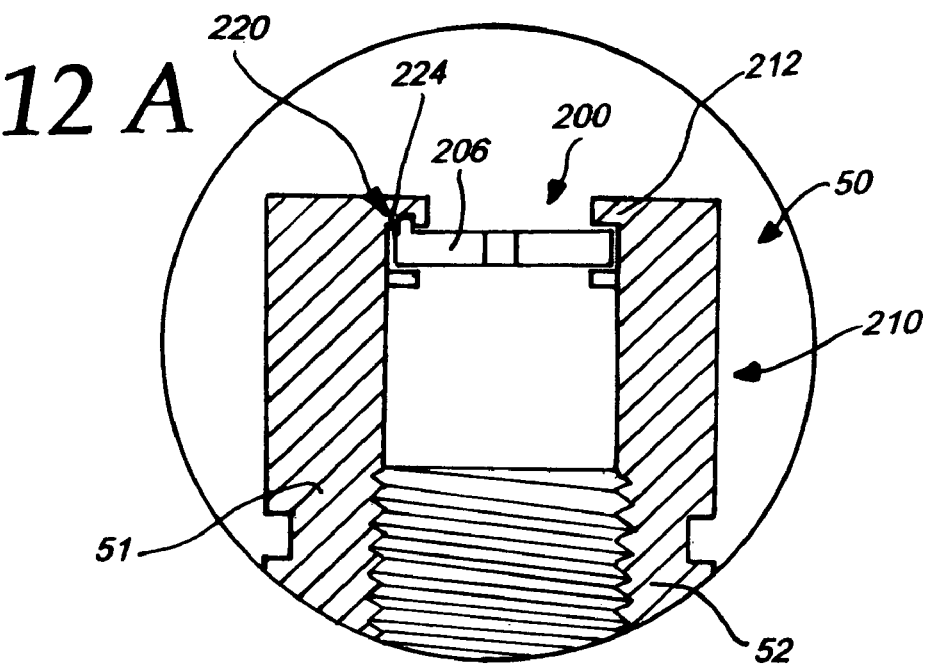
Figure 12:
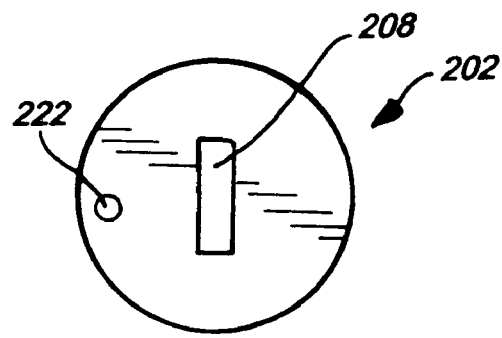
Figure 12:
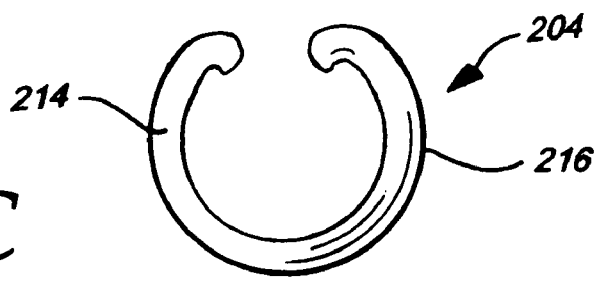

Accordingly, the cooling head 40 and particularly the socket portion 50 alternatively can be provided with a removable fluid directing assembly 200, as shown in FIGS. 12A–12C. The fluid directing assembly 200 includes a disc member 202 (FIG. 12B) and a retainer 204 (FIG. 12C) that removably captures the disc member 202 in the cooling head socket 50, as can be see in FIG. 12A. The disc member 202 includes a thin body 206 having slit 208 formed generally centrally therein. The slit 208 directs fluid in a focused spray pattern against surface 59 of the anode assembly 11 in the socket portion 62 thereof. The disc member 202 is placed in the cooling head socket 50 so that the slit 208 thereof is aligned with the electrode pattern directed at the anode material on the anode assembly surface 61. In this manner, the cooling fluid is first directed at the area on the surface 59 that is likely most in need of cooling.

More particularly, the socket wall 51 can be provided with an end portion 210 that extends beyond the threaded portion 52. The end wall portion 210 can include an annular flange 212 at its free end with the disc member 202 abutted thereagainst about its periphery and fixed thereat by the retainer 204. Accordingly, the fluid directing assembly 200 is adjacent the filter holder 70 in the socket 50 so that it directs filtered fluid at the desired location on the anode assembly 11 axially adjacent thereto. An alignment mechanism 220 is provided between the disc member 202 and socket 50 to cause the slit 208 to be aligned with the line or spot target area for electrodes on the anode assembly 11. The alignment mechanism 220 can include a nub or projection 222 at a predetermined position on the disc member 202 for being received in a corresponding recess 224 in the socket flange 212, as shown in FIG. 12A. Manifestly, the nub projection 222 and recess 224 could be reversed to be formed on the flange 212 and disc member 202, respectively. With the nub projection 222 received in the recess 224, the spray slit 208 will be properly aligned to direct filtered cooling fluid at the area on the anode assembly surface 59 corresponding with the anode target area, as previously described. On the other hand, when the slit 208 is misaligned, the disc member 202 will not sit flat or flush against the internal surface of the socket flange 212 to provide the operator an indication that the disc 202 needs to be shifted for proper slit alignment. Both the disc members 202 and the retainer clip 204 can be of a non-corrosive metallic material.

As shown, the retainer 204 can be in the form of a resilient C-clip with arcuate arm portions 214 and 216 that are biased in engagement with the unthreaded interior surface of the end wall portion 210. Thus, with the fluid directing assembly 200 removably fixed in the cooling head socket 50, most of the anode assembly surface 59 will be obstructed from view when looking through the cooling head socket 50 with the filter holder 70 removed. However, the C-clip retainer 204 is sized and configured to allow an operator to push the clip arm portion 214 and 216 toward each other so that the clip 204 can be easily fit through the socket 50 including the threaded portion 52 thereof. Thereafter, the disc member 202 can be manipulated to fit through the socket 50 including its threaded portion 52 to provide a substantially unobstructed view of the surface 59 about the electrode target area through the socket 50. In this regard, the disc member 202 can include an outer diameter sized in clearance with the internal threads of the socket threaded portion 52, as can be seen in FIG. 12A.

Figure 13:
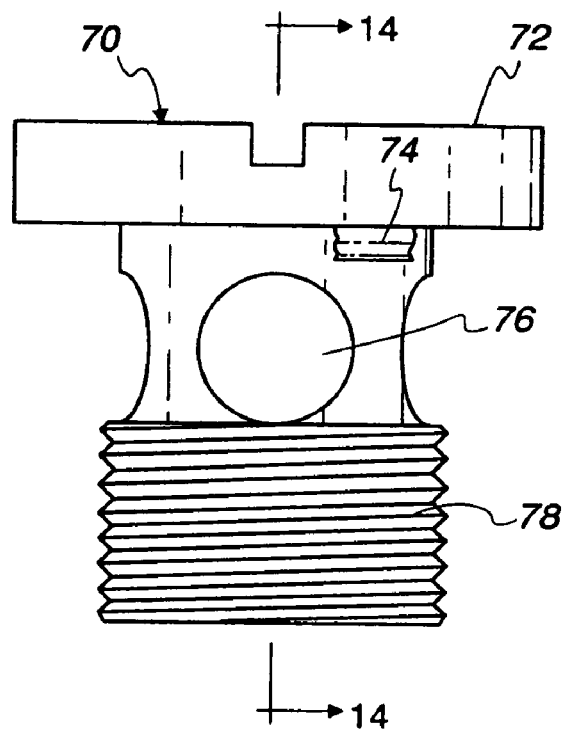
FIG. 13 is an elevational view of the filter holder in the form of a screw showing a cross-bore extending therethrough.

Referring now to FIG. 13, a filter holder in the form of a screw-type member is generally indicated at 70. The filter holder 70 is provided with a detachable connection to the X-ray head 10, and specifically to the head cover plate 40. In this regard, with the preferred and illustrated screw-type filter holder 70, there is a threaded connection 71 provided between the holder 70 and cover plate 40. In this manner, the filter holder 70 can be easily removed for filter servicing by unscrewing the holder 70 either from the cover plate 40 in place on the X-ray head 10 or alternatively after removal of the cooling head cover plate 40 off from the X-ray head 10. Preferably, if the cooling head plate 40 does not need servicing, it is left in place with only filter holder 70 removed so as to keep fluid channels 24 and 26 substantially isolated from the external environment. In either instance, the X-ray tube 12 and outer housing 14 therefor can remain assembled while filter holder removal and filter servicing take place. Accordingly, the filter holder 70 together with the cover plate 40 also can be termed a filter holder or carrier that is readily removable from the head 10 without requiring significant disassembly thereof, and in particular of the tube 12 from the outer housing 14.

Figure 14:
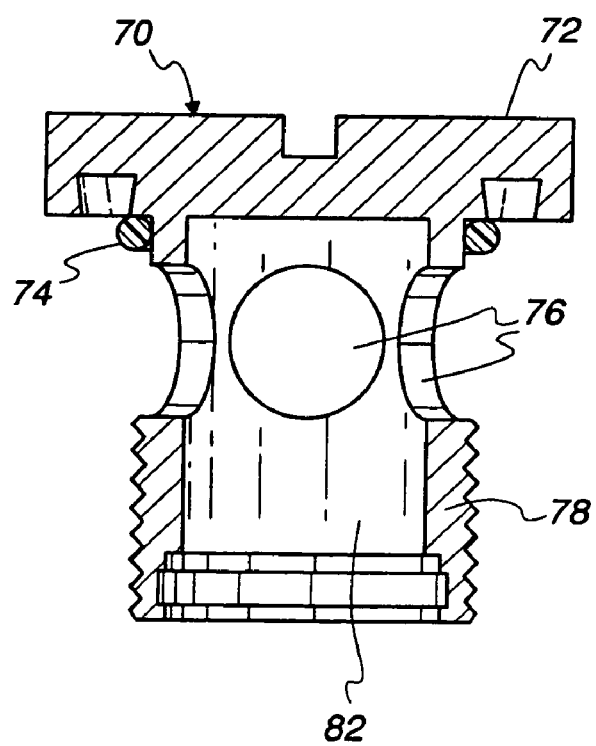
FIG. 14 is a cross-sectional view taken along the line 14—14 of FIG. 13 showing an opening to another cross-bore extending through the filter holder.

As illustrated, the preferred screw-type holder 70 can include an enlarged head portion 72 including drive surfaces 72a configured to mate with a similarly configured screw driver tool, and an elongate shank or stem portion 73 depending from the head portion. As shown, the filter holder screw 70 further includes an O-ring seal or gasket 74, a proximate unthreaded portion 75 of the shank 73 having at least one cross hole 76 formed therein, and a distal externally threaded portion 78 of the shank 73. As best seen in FIG. 14, a pair of cross-bores 76 are preferably provided which can extend orthogonally relative to one another. The proximate unthreaded portion 75 is preferably of reduced diameter relative to the distal shank portion 78 to allow for coolant intake when the portion 75 and bores 76 therein are axially aligned with passageway 42, although the openings to the bores 76 may not be angularly aligned with the radial direction of flow in the passageway 42, as will be described more fully hereinafter. Alternatively, the shank 73 can be of substantially consistent diameter along its length with variations due to its threading, and the arcuate, axially extending wall portion 53 of the cooling head can be enlarged in terms of its radius relative to projecting annular wall portion 51. Nevertheless, with two bores 76, generally there will always be at least a portion of an opening to one bore 76 or the other or both in general angular alignment with the radial flow distribution in coolant intake passageway 42 of the cover plate 40 when the filter holder 70 is tightened into the threaded socket 50 of the plate 40. Also by making the holes 76 through bores, there will always be two openings as with a single through bore 76, or four openings with the illustrated pair of cross-bores 76 for omni-directional coolant intake into the filter holder 70. Depending upon the heat loadings and operating temperatures experienced, the filter screw can be made from virtually any suitable conventional material such as metals including brass and stainless steel, metal alloys, ceramics and filled or unfilled plastics.

When installed in socket 50, filter screw 70 engages the cooling head in a number of ways. Referring again to FIGS. 2 and 3 first, the external threaded portion 78 mates with the threaded portion 52 of socket 50 (see FIG. 2), thus providing the axial position and force needed for alignment and sealing engagement. As the threaded engagement is advanced, O-ring 74 sealingly engages the enlarged end 54*a* of socket portion 54, and specifically beveled or chamfered surface portion 54*b* thereof. This brings cross hole 76 into axial alignment for flow communication with cooling head passageway 42.

Figure 4:
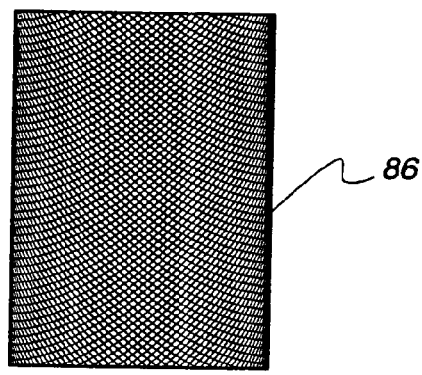
FIG. 4 is an elevational view of a cylindrical filter screen.
Figure 5:
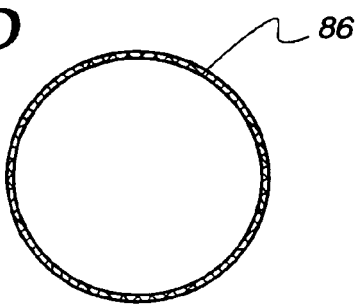
FIG. 5 is an end view thereof.
Figure 6:
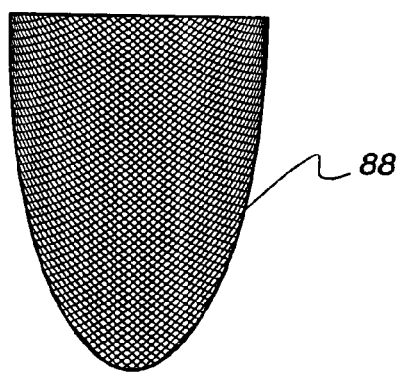
FIG. 6 is an elevational view of a bowl-shaped filter screen.
Figure 7:
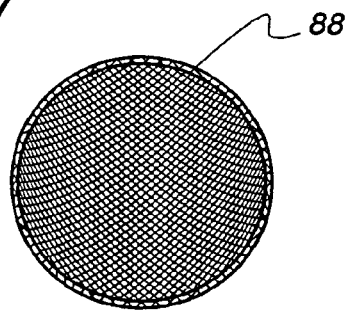
FIG. 7 is an end view thereof.
Figure 8:
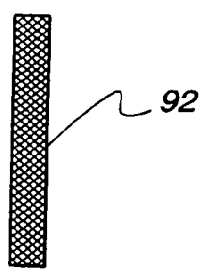
FIG. 8 is an elevational view of a flat screen filter.
Figure 9:
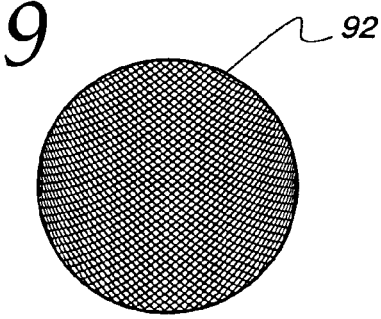
FIG. 9 is an end view thereof.
Figure 10:
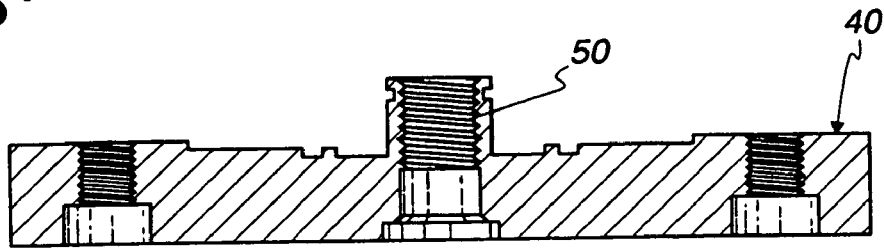
FIG. 10 is a cross-sectional view taken along the line 10—10 of FIG. 1 showing bores for a pair of fasteners for the cooling head.
Figure 15:
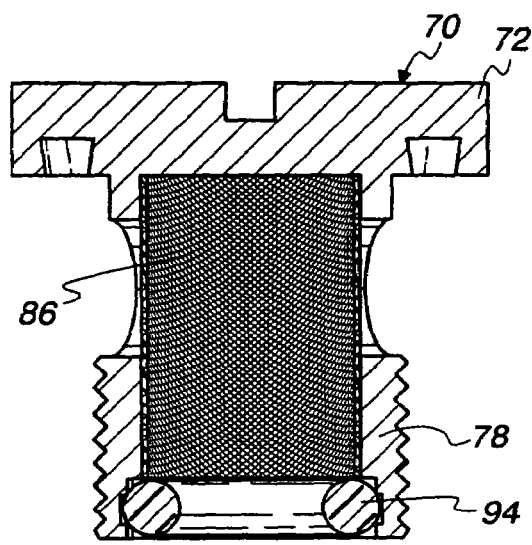
FIGS. 15–17 are cross-sectional views similar to that of FIG. 14, but showing different filter screens inserted in the filter screw.
Figure 16:
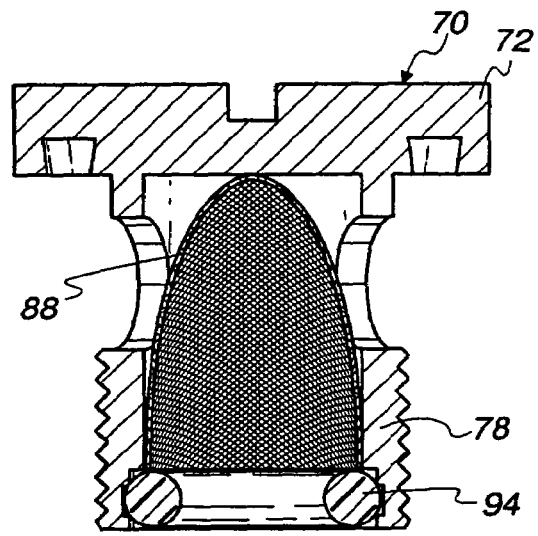
Figure 17:
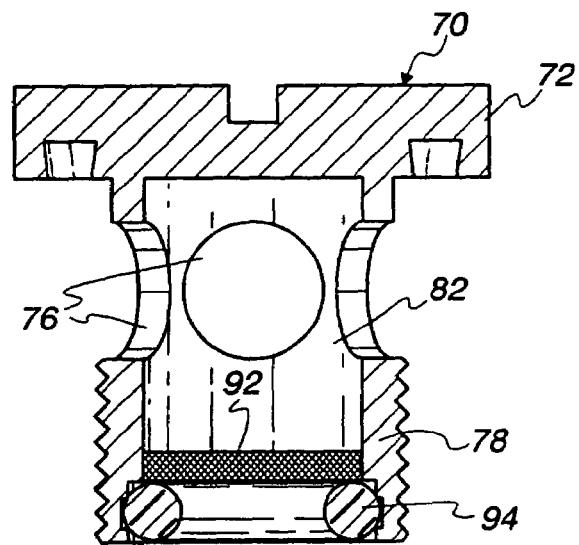

As can be seen in FIG. 14, the shank 73 of filter screw 70 has a hollow bore 82 communicating with the cross holes 76. The bore 82 has an open end 83 so that coolant is redirected from radial flow in the passageway 42 to axial flow in the bore 82 and out from the end 83 thereof into socket 62. As previously discussed, the filtered fluid is preferably focused to flow axially in a slot pattern to optimize heat transfer efficiencies with the high heat target area of the anode assembly 11. As indicated in FIGS. 15–17, a variety of filter screens are insertable within internal bore 82 and are carried by the filter screw shank or stem 73 to provide filtration of coolant traveling through device 10. Retainer member 94 mounted adjacent bore end 83 maintains the desired position of the filter screen in bore 82. Referring to FIG. 4, a cylindrical screen filter 86 has an external diameter for close fit engagement within bore 82 of filter screw 70. As shown in FIG. 6, a bowl screen 88 having an arcuate small end 89 and opening to an enlarged opposite end 90 is inserted within bore 82 so that filter end 90 is adjacent bore end 83 and retainer member 94 thereat and smaller end 89 is adjacent the screw head 72, as seen in FIG. 16. As shown in FIG. 17, a flat screen 92 is inserted within the bore 82 adjacent open bore end 83 and is secured with retainer member 94.

The filter screens shown in FIGS. 4–9 can be made of virtually any material desired, and are preferably made of high temperature materials such as metals, metal alloys and ceramics. Most preferably, the filter screens are made of wire mesh or screen work material formed using conventional techniques to achieve the shapes indicated in the drawings. Regardless of the shape of filter screen employed, the coolant flow passing through device 10 is made to pass through at least one surface area portion of the filter screen owing to alignment of the filter screw within socket 50. Preferably, the mesh size of the filter screen or opening size of a ceramic or other cast material, is selected so as to trap particulate traveling in the coolant passing through device 10.

In the arrangement shown, the X-ray tube 12 is preferably operated in a "dry" condition, and it is important that the particulate be trapped so as to prevent a degradation of cooling performance. Since the filter is carried within a threaded filter screw 70 accessible from outside the housing, the filter screen is easily inserted and removed and the filter can be cleaned and inspected as often as necessary with minimal inconvenience. Alternatively, the filter can remain in place in the holder and water can be fed through the access holes 76*a* for flushing the filter clean. If necessary, the filter screens and the O-ring 74 (see FIGS. 13 and 14) can be easily replaced during a service operation.

Referring to FIG. 3, as previously mentioned, the through hole 76 is formed in a reduced diameter portion 75 of the filter screw. As shown, openings 76*a* to the through bores 76 can be provided in arcuate, recessed cutouts in the non-threaded shank portion 75. Accordingly, these openings 76*a* are recessed from the socket wall extension portion 53 that extends about the shank portion 75 except at the passageway 42, as can be seen in FIGS. 2 and 10–12. This allows for omnidirectional water intake, independent of screw rotational position. Thus, the attention of service personnel can be fully devoted to torquing the screw filter as required to properly seat the O-ring in the socket portion 54 of cooling head 40. As will be appreciated, the filter service operation is concentrated on only one element needed for removal and accordingly, down time for performing the service operation is greatly reduced. Further, the service operation is performed only on the filter screw and the cooling head is not subjected to degradation associated with disassembly of the device 10, and particularly removal of X-ray tube 12 therefrom. This provides a substantial improvement arises since the X-ray tube is allowed to remain undisturbed, and in particular, the X-ray tube need not be removed and its outer surface need not be contacted by service personnel. This protects tube alignment relative to the housing and avoids possible contamination of the sensitive surfaces of the X-ray tube, such as beryllium windows, or the like.

Turning to more of the details, the cover plate 40 is provided with countersunk apertures 100 for receipt of fasteners to be threaded into aligned apertures of the outer housing 14. As shown in FIG. 1, the plate 40 can have a generally square configuration with the apertures 100 provided at non-adjacent corners 102 and 104 toward the outer periphery of the plate 40. The short axial inlets and outlets 42*a* and 44*a* of respective plate head radial passageways 42 and 44 in alignment with intake and outake passageways 24 and 26 of the outer housing are provided at the remaining pair of non-adjacent corners 106 and 108 of the plate 40.

As can be seen best in FIG. 3, the outer housing wall portions 22*a* and 22*b* are provided with annular grooves 110 and 112 at their inner diameter and at the end of the housing 14 facing the plate inner surface 41. Annular or O-ring seals 114 and 116 are received in the grooves 110 and 112, respectively, and are tightly compressed when the plate 40 is fastened to the housing 14 so as to provide for fluid tight sealing between the coolant intake passageways 24 and 42 and outake passageways 26 and 44. In addition, a step down area 118 is provided on the plate inner surface 41 for tight fitting reception of the periphery 120 of the heat sink member 60, as seen in FIGS. 3 and 10–12. The step down area 118 is formed radially inward of the passageway inlet 42*a* and outlet 44*a*, and the fastener apertures 100. An annular groove 122 (FIG. 11) is formed in the step down area 118 of the plate inner surface 41 for receipt of an annular seal 124. Again, when the plate 40 is fastened to the housing 14, the seal 124 is compressed by engagement with facing flat surface 126 of the heat shank member 60 fixedly mounted at the outer axial end of the housing 14 so that there is a fluid tight sealing between the surface 41 in the step down area 118 and the heat sink surface 126. In this manner, fluid flowing out from the filter holder bore 82 into socket portion 62 of the heat sink member 60 will flow into inlet port 55, as previously described.

As indicated above, the improved cooling arrangement of the present invention is shown in conjunction with the dry X-ray tube preferred in the present invention. However, the present invention also contemplates other cooling arrangements in which the filter screw is disposed within a coolant circulating path for X-ray emitting devices in which the X-ray tube is immersed within a fluid filled outer housing. The continuous filtration provided by the present invention serves a need in these applications to remove particulate from the coolant flow, preventing the particulates from causing voltage breakdown or flash over between the outer housing and vacuum tube.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A non-destructive testing system comprising:
    an X-ray head assembly for directing high energy at an object to be tested;
    an anode of the X-ray head assembly for generating X-rays;
    a detector that detects resultant energy from the object;
    a coolant flow path formed in the head assembly;
    a filter holder;
    a filter carried in the holder; and
    a detachable connection between the holder and the head assembly that removably connects the filter holder to the X-ray head assembly in a substantially fixed position adjacent to the anode and allows the holder to be quickly and easily detached from the head assembly for filter servicing while substantially leaving the remainder of the head assembly intact and assembled together.

2. The non-destructive testing system of claim 1 wherein the filter holder comprises a cover plate for being secured to the head assembly and a filter screw for being threaded to the cover plate.

3. The non-destructive testing system of claim 2 wherein the filter screw can be unthreaded from the cover plate for filter servicing with the cover plate attached to or removed from the head assembly.

4. The non-destructive testing system of claim 1 wherein the detachable connection is a threaded connection.

5. The non-destructive testing system of claim 1 wherein the detector comprises a pair of detectors carried by the X-ray head assembly.

6. A non-destructive testing system comprising:
    an X-ray head assembly for directing high energy at an object to be tested;
    a detector that detects resultant energy from the object;
    a coolant flow channel formed in the head assembly;
    a filter holder;
    a filter carried in the holder;
    a detachable connection between the holder and the head assembly that allows the holder to be quickly and easily detached from the head assembly for filter servicing while substantially leaving the remainder of the head assembly intact and assembled together, wherein the X-ray head assembly comprises an X-ray tube and a housing surrounding at least a portion of the X-ray tube; and
    liquid coolant for conducting heat away from said X-ray tube;
    a housing including the flow channel for channeling flow of said liquid coolant;
    the filter holder having a head portion and a stem portion with the filter carried in the stem portion;
    the housing including a receptacle for receiving the filter holder to allow the filter to be disposed in the flow channel to thereby provide cleaning of the liquid coolant.

7. The non-destructive testing system of claim 6 wherein the stem portion defines a hollow bore dimensioned to receive said filter.

8. The non-destructive testing system of claim 6 wherein said head portion is enlarged with respect to said stem portion.

9. The non-destructive testing system of claim 6 wherein said filter holder is removably received in said receptacle via the detachable connection.

10. The non-destructive testing system of claim 6 wherein said filter holder comprises a filter screw having a threaded portion along said stem portion.

11. The non-destructive testing system of claim 6 wherein said stem portion defines a cross hole and an internal bore for receiving said filter with the internal bore communicating with said cross hole.

12. The non-destructive testing system of claim 11 wherein said housing receptacle includes a threaded portion and said stem portion includes a threaded portion for mating engagement with the housing receptacle.

13. The non-destructive testing system of claim 6 wherein said housing includes an outer wall containing said receptacle and said receptacle communicates with the exterior of said housing so that the filter holder is accessible from outside the housing.

14. The non-destructive testing system of claim 13 wherein said outer wall comprises one of a cooling head and a heat sink member.

15. The non-destructive testing system of claim 14 wherein the filter holder includes the cooling head.

16. The non-destructive testing system of claim 13 wherein the receptacle includes a socket portion for receiving the stem portion of the filter holder, the socket portion including a socket wall portion for deflecting coolant flow passing through a cross hole, through said stem portion.

17. The non-destructive testing system of claim 6 wherein said X-ray tube includes an anode assembly and a heat sink in thermal communication with the anode assembly.

18. The non-destructive testing system of claim 17 wherein said heat sink defines a socket portion for directing coolant flow exiting said filter holder in a direction generally toward said head portion.

19. The non-destructive testing system of claim 6 wherein said housing comprises a hollow jacket surrounding said X-ray tube with the hollow interior of said jacket comprising said flow channel.

20. The non-destructive testing system of claim 19 wherein said hollow jacket has a generally cylindrical configuration and said housing further includes a cooling head engageable with one end of said cylindrical hollow jacket, said cooling head defining an internal passageway in flow communication with the flow channel of said hollow jacket.

21. The non-destructive testing system of claim 20 wherein said internal passageway extends radially in said cooling head.

22. The non-destructive testing system according to claim 21 wherein said housing receptacle is located generally at the center of said cooling head, said cooling head defining diametrically opposed flow passageways of the internal passageway including inlet and outlet flow passageways extending in a generally radial direction.

23. The non-destructive testing system of claim 6 wherein the interior of said housing is maintained free of said liquid coolant.

24. An X-ray diffraction device comprising:
an X-ray tube including an anode assembly;
a housing surrounding at least a portion of the X-ray tube;
a liquid coolant for conducting heat away from said X-ray tube;
the housing including a flow channel for channeling flow of said liquid coolant, said flow channel passing adjacent said anode assembly so as to withdraw heat therefrom;
a filter holder;
a filter carried in the filter holder; and
the housing including a receptacle for removably receiving the filter holder so as to dispose the filter in the flow channel to thereby provide cleaning of the cooling medium.

25. The X-ray diffraction device of claim 24 wherein the filter holder includes a head portion and a hollow stem portion, and said stem portion defines a cross hole and an internal bore for receiving said filter with the internal bore communicating with said cross hole.

26. The X-ray diffraction device of claim 25 wherein said housing receptacle includes a threaded portion and said stem portion includes a threaded portion for mating engagement with the housing receptacle.

27. The X-ray diffraction device of claim 24 wherein said housing comprises a hollow jacket surrounding said X-ray tube with a hollow interior of said jacket comprising said flow channel.

28. The X-ray diffraction device of claim 27 wherein said hollow jacket has a generally cylindrical configuration and said housing further includes a cooling head engageable with one end of said cylindrical hollow jacket, said cooling head defining an internal passageway in flow communication with the flow channel of said hollow jacket.

29. The X-ray diffraction device according to claim 28 wherein said housing receptacle is located generally at the center of said cooling head, said cooling head defining diametrically opposed flow passageways including inlet and outlet flow passageway extending in a generally radial direction.

30. The X-ray diffraction device of claim 24 wherein the filter holder includes a head portion and a hollow stem portion, said anode assembly includes a heat sink portion that defines a socket portion for directing coolant flow exiting said filter holder in a direction generally toward said head portion.

31. The X-ray diffraction device of claim 24 wherein the housing includes a cooling head, the housing receptacle includes a socket of the cooling head, and
a fluid directing assembly removably carried in the cooling head socket for directing liquid coolant in a predetermined pattern at the anode assembly with removal of the fluid directing assembly permitting substantially unobstruct viewing of the anode assembly through the cooling head socket.

32. A method of cooling an X-ray tube, comprising:
surrounding at least a portion of the X-ray tube with a housing;
providing the housing with a flow channel for channeling flow of a liquid coolant;
providing a filter holder having a head portion and a stem portion;
providing a filter;
carrying the filter on the stem portion;
receiving the filter holder in the housing so as to dispose the filter in the flow channel; and
flowing the liquid coolant through the flow channel so as to filter the liquid coolant.

33. The method of claim 32 wherein the filter is received in the housing by threading the stem portion of the filter holder to a cooling head of the housing.

34. The method of claim 32 including removing the filter holder from the housing for filter servicing leaving the housing in surrounding relation to the X-ray tube.

35. The method of claim 32 further comprising defining in the stem portion a hollow bore dimensioned to receive said filter.

36. The method of claim 35 further comprising defining in said stem portion a cross hole with the bore communicating with said cross hole.

37. An X-ray diffraction device comprising:
an X-ray diffraction tube including an anode assembly;
a housing assembled with the tube to extend about at least a portion of the X-ray diffraction tube;
a flow channel of the housing for the flow of liquid fluid in the channel, the flow channel passing adjacent the anode assembly to withdraw heat therefrom; and
a fluid directing assembly that is removably fixed to the housing so that fluid is directed toward the anode assembly and to allow the fluid directing assembly to be removed from the housing for visual inspection of the anode assembly while substantially keeping the X-ray diffraction tube and housing assembled together.

38. The X-ray diffraction device of claim 37 wherein the housing includes a cooling head, and the fluid directing assembly is removably mounted to the cooling head.

39. The X-ray diffraction device of claim 37 wherein the housing includes a receptacle, and the fluid directing assembly includes a retainer and a fluid directing member with the retainer removably fixing the fluid directing member in the housing receptacle adjacent the anode assembly.

40. The X-ray diffraction device of claim 39 wherein the housing includes a cooling head in which the receptacle is formed, and
a filter assembly removably received in the receptacle adjacent the fluid directing assembly so filtered fluid is directed toward the anode assembly.

* * * * *

UNITED STATES PATENT AND TRADEMARK OFFICE
CERTIFICATE OF CORRECTION

PATENT NO. : 7,203,282 B2
APPLICATION NO. : 10/776877
DATED : April 10, 2007
INVENTOR(S) : Michael Brauss It is certified that error appears in the above-identified patent and that said Letters Patent is hereby corrected as shown below:

Claim 6, column 11, line 64 delete "a" and insert -- the --
(From Application, page 3, claim 6, line 13) and ;

Claim 31, column 13, line 57 delete "unobstruct." and insert -- unobstructed --
(From Application, page 7, claim 31, line 6).

Signed and Sealed this

Fifth Day of June, 2007

JON W. DUDAS
*Director of the United States Patent and Trademark Office*